United States Patent [19]

Huffman et al.

[11] Patent Number: 4,706,908
[45] Date of Patent: Nov. 17, 1987

[54] LIGHTWEIGHT AUXILIARY POWER AND FORCED AIR SUPPLY UNIT

[75] Inventors: Joseph G. Huffman; Thomas L. Seidl, both of Lincoln, Nebr.

[73] Assignee: Duncan Aviation, Inc., Lincoln, Nebr.

[21] Appl. No.: 901,690

[22] Filed: Aug. 29, 1986

Related U.S. Application Data

[63] Continuation of Ser. No. 659,220, Oct. 10, 1984, abandoned.

[51] Int. Cl.$^4$ ............................................. B64D 13/06
[52] U.S. Cl. ................................... 244/118.5; 244/58; 98/1.5; 60/39.33; 62/134
[58] Field of Search ................... 244/118.5, 58, 53 R; 60/39.07, 39.142, 39.33; 98/1.5; 417/411, 423; 290/2, 52; 62/134, DIG. 5, 241, 243; 169/62

[56] References Cited

U.S. PATENT DOCUMENTS

| | | | |
|---|---|---|---|
| 2,777,301 | 1/1957 | Kuhn | 244/118.5 |
| 3,043,115 | 7/1962 | Harter | 62/134 |
| 3,219,831 | 11/1965 | Ray et al. | 244/118.5 |
| 3,324,675 | 6/1967 | Mills | 244/118.5 |
| 3,711,044 | 1/1973 | Matulich | 244/118.5 |
| 3,775,745 | 11/1973 | Kelley | 244/53 R |
| 3,859,785 | 1/1975 | Leto et al. | 60/39.33 |
| 3,987,279 | 10/1976 | Borelan et al. | 244/53 R |
| 4,462,561 | 7/1984 | Cronin | 244/118.5 |
| 4,482,018 | 11/1984 | Enk et al. | 169/62 |
| 4,494,372 | 1/1985 | Cronin | 244/118.5 |
| 4,523,517 | 6/1985 | Cronin | 244/118.5 |

FOREIGN PATENT DOCUMENTS

2076897 12/1981 United Kingdom ............. 244/118.5

OTHER PUBLICATIONS

"Environmental Control Systems", Garrett brochure.

*Primary Examiner*—Galen Barefoot
*Attorney, Agent, or Firm*—Henderson & Sturm

[57] ABSTRACT

A lightweight auxiliary power and forced air supply unit that may be used to provide electricity and forced air for use by an air conditioning system on a vehicle such as an aircraft. The unit includes a turbine (12), a generator (13), a forced air unit (14), a primary control unit (16), and a primary display and input control unit (17). The apparatus further includes an electronic sequence unit (18), a secondary display unit (19) and an ignition exciter unit (21), in addition to a modulated bleed air valve (22), a fuel pump (23), a fuel valve (24), and a fuel source (26). The apparatus also includes a heat sensor unit (27) and a fire protection unit (28), and connects to the electrical system buss (29) of the aircraft. As configured and as installed, this apparatus weighs less than two hundred pounds.

21 Claims, 11 Drawing Figures

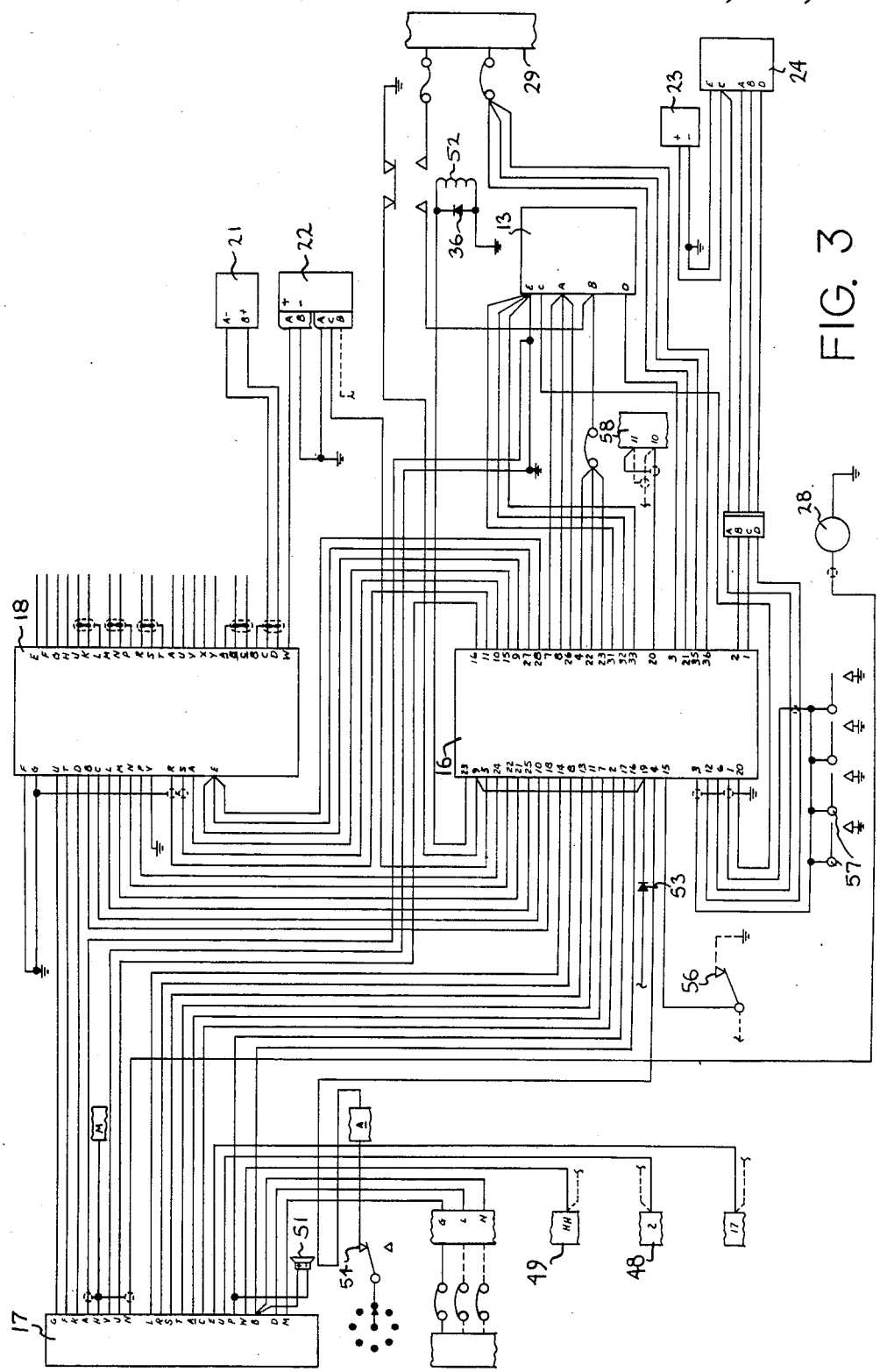

LIGHTWEIGHT AUXILIARY POWER AND FORCED AIR SUPPLY UNIT

This is a continuation of co-pending application Ser. No. 659,220 filed on Oct. 10, 1984, now abandoned.

TECHNICAL FIELD

This invention relates generally to auxiliary power supply units, and more particularly to such units as provided on jet aircraft to support on-ground systems functioning.

BACKGROUND ART

Most jet aircraft are equipped with air conditioning systems, in addition to other environmental control apparatus, to ensure passenger and flight crew comfort and safety. During flight, such air conditioning systems pose no substantial operational problems. The main power plant for the craft will typically provide adequate electric power for the system and will further provide a sufficient source of bleed air for use in ensuring an adequate air flow through the air conditioning system.

Where ground support does not include the provision of electric power, as will often be the case with non-commercial aircraft, some source on the craft itself must be utilized to provide electric power when on the ground. For instance, the main power plant for the craft can be utilized to provide such electric power and bleed air. Operation of the jet engines for such a limited purpose, of course, comprises a most inefficient way of providing such power.

Alternatively, an on-board auxiliary power unit can be provided as a source of electric power. Such auxiliary power units have been wholly inappropriate to date for use on small aircraft of the small cabin class that are rated for no more than sixteen passengers, including both turbo prop and small turbo jet craft, because of their weight. The lightest auxiliary power unit suitable for installation on an aircraft or other small vehicle known to the applicants weighs between 250 and 325 pounds, installed. This weight makes the unit unacceptable by aircraft owners as it reduces the passenger and cargo carrying capacity of small cabin class aircraft to non-useful levels.

There therefore exists a need for a lightweight auxiliary power and forced air supply unit that will weigh less than 200 pounds, installed. Such a unit should provide for a relatively economical source of electricity and a relatively economical source of bleed air and forced air for appropriate use by an on-board air conditioning system. Such a unit should be relative simple to install on existing aircraft, and must be safe for use in aircraft. Beyond this, such a unit should be easily monitored and controlled by the flight crew and include various safety features appropriate to its location and interaction with other aircraft systems.

DISCLOSURE OF THE INVENTION

These and other needs are substantially met by provision of the lightweight auxiliary power and forced air supply unit disclosed herein. this unit provides both adequate electricity and forced air for use by an on board air conditioning system and electricity for general use aboard a vehicle such as an aircraft.

This supply unit includes generally a turbine unit, a generator unit, a forced air unit, and a control and regulator unit. The turbine unit creates rotational energy in the form of a rotating shaft and includes appropriate mechanisms to ensure fuel delivery and ignition. The generator unit couples operably to the turbine unit and converts the rotational energy of the turbine unit into electrical energy. The forced air unit connects to the generator unit and promotes air flow that may be used to both cool the generator and to provide forced air flow to the air conditioning system that may be used to cool cabin-destined air.

The control and regulator unit includes a primary control unit for monitoring and controlling the turbine unit, generator unit and forced air unit. The control and regulator unit further includes a display unit and an input control unit conveniently positioned within the cabin of the aircraft, such that a person located at the pilot's operating station can operate the input control unit. Through the display unit, the flight crew can confirm proper functioning of the lightweight auxiliary power and forced air supply unit and through the input control unit, the flight crew can control the auxiliary power and forced air supply unit with respect to certain functions.

Many safety features are included to ensure proper functioning of the auxiliary power and forced air supply unit and the noneventful operation of such unit within an aircraft.

BRIEF DESCRIPTION OF THE DRAWINGS

These and other attributes of the invention will become more clear upon a thorough review and study of the following description of the Best Mode for Carrying out the Invention, particularly when reviewed in conjunction with the drawings, wherein:

FIG. 3 comprises a general schematic diagram depicting interconnections between various units of the invention;

BEST MODE FOR CARRYING OUT THE INVENTION

Figure 1:
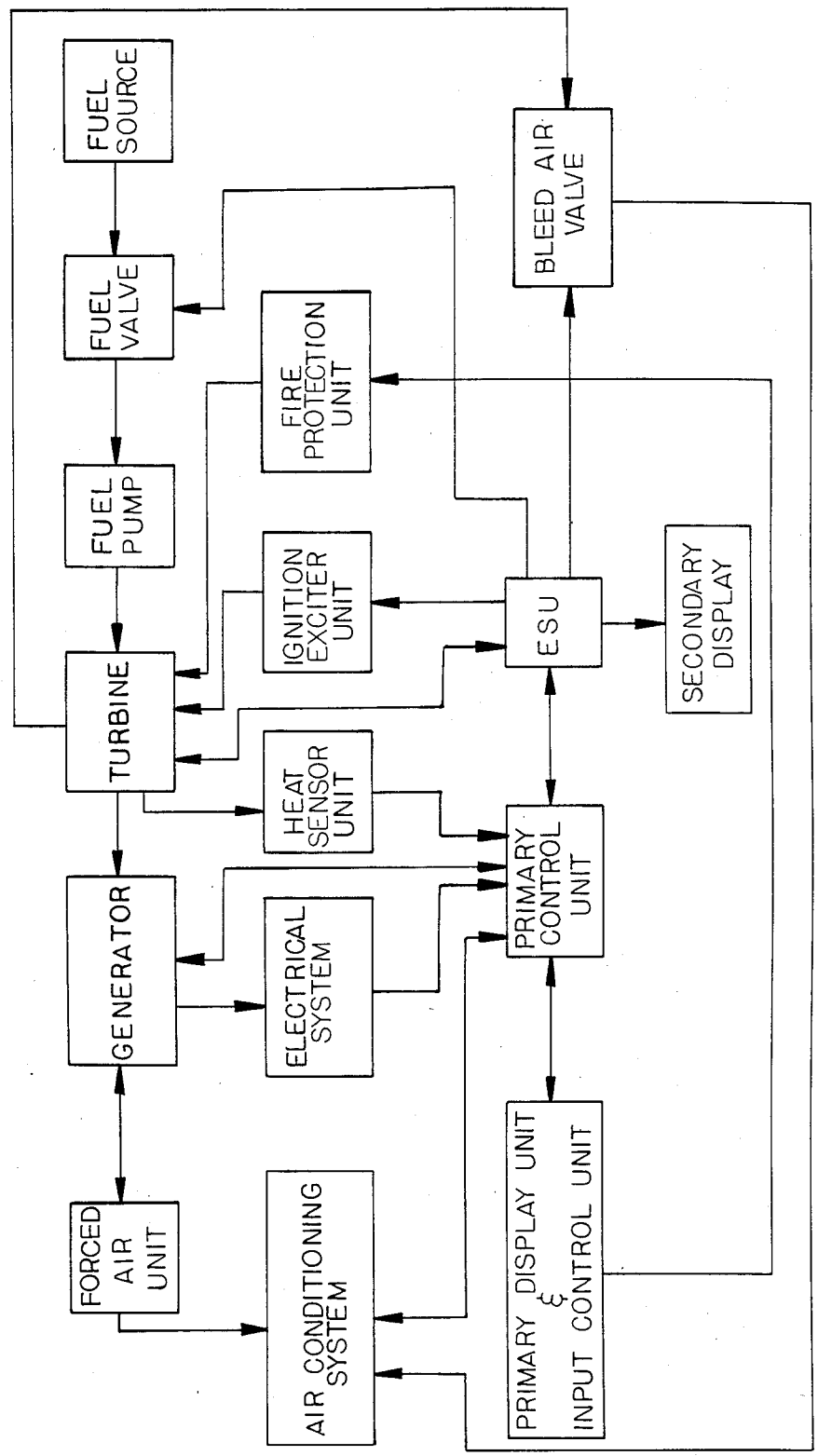
FIG. 1 comprises a block diagram of the invention as connected to an existing on board air conditioning system.

Referring now to the drawings, and in particular to FIG. 1, the apparatus of the invention can be seen as depicted generally in block diagram format by the numeral 10. The apparatus (10) is shown as connected to an air conditioning system (11). The apparatus of the invention includes generally a turbine (12), a starter/generator (13), a forced-air unit (14), a primary control unit (16), and a primary display and input control unit (17). The apparatus (10) further includes an electronic sequence unit (18), a secondary display unit (19) and an ignition exciter unit (21), in addition to a modulated bleed air valve (22), a fuel pump (23), a fuel valve (24) and a fuel source (26). Finally, the apparatus (10) includes a heat sensor unit (27) and a fire protection unit (28), and connects to the electrical system bus (29) of the aircraft.

It should be understood that, although this particular embodiment of the invention will be described with respect to an installation in a jet aircraft, the lightweight auxiliary power and forced air supply unit disclosed herein could be used in other vehicles or modes of transport as well with similar desirable results.

These various units and components will now be described in more detail in seriatim fashion.

Figure 2:
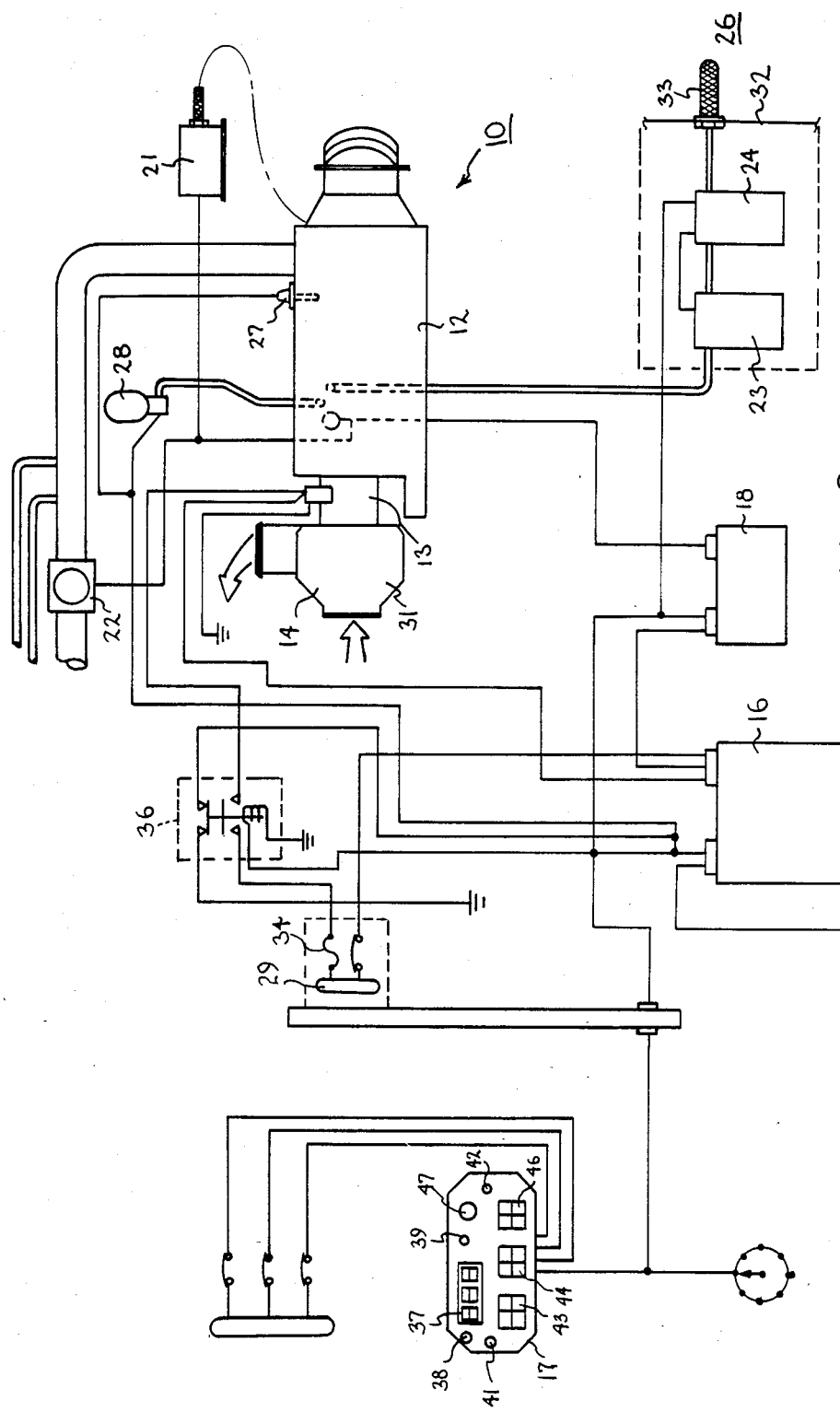
FIG. 2 comprises a block diagram depicting various units of the invention as interconnected between one another.

Referring now to FIG. 2, the turbine (12) may be provided by a turbine auxiliary power unit part No. Gemini T-20G-10C1 as manufactured by Turbomach. Such a turbine can produce a maximum of 28 h.p. or 18 p.p.m. bleed air flow.

The rotating shaft of the turbine (12) connects to a generator (13) such as an EM8018 as manufactured by Electromech. This part number identifies a generator that has been manufactured in accordance with the applicants' design and specifications. For instance, this generator has a 300 ampere rating at 30 volts for a 9 kilowatt power output at 12,000 r.p.m. In general, such a generator would be able to maintain this power rating over a variable operating range, such as 6,000 to 12,000 r.p.m. Given the dedicated purpose the applicants intend this generator for, however, they discovered that a satisfactory generator could be created by designing one that operated to specifications over only a small range, with an attendant important reduction in weight. By way of illustration, most 300 ampere generators weigh between 32 to 35 pounds, and some go as low as 29 pounds. The generator designed by the applicants weighs only 26.4 pounds, and this figures includes the fan (709) described in more detail below. The applicants also managed to reduce weight by not including any starter windings. Instead, the turbine is started through appropriate control of the field windings shunt field by the primary control unit (16) described in more detail below. The armature shaft of the generator (13) in turn connects to the forced air unit (14). The forced air unit comprises generally an enclosed cavity (31) and a generator coupled fan (described in more detail below).

The wing tank (32) for the aircraft may be provided with a screened fuel port (33), which port then connects through a fuel shut-off valve (24) and a fuel pump (23) to the turbine (12). The fuel pump (23) may be vane type fuel pump and operates to pump fuel from the wing tank (32) to the turbine (12) when the fuel shut-off valve (24) is open and the fuel pump (23) is activated.

The ignition exciter unit (21) may be a capacitor discharge type and serves to energize and activate the turbine (12) upon command. The modulating bleed air valve (22) connects between the bleed air output of the turbine (12) and the air conditioning system (11) to provide air to be cooled for use in cooling the aircraft cabin.

The electronic sequence unit (18) comprises a microprocessor based turbine control device that governs and monitors start up and deactivation of the turbine and that further monitors turbine revolutions per minute and exhaust gas temperatures. The electronic sequence unit (18) is provided in conjunction with the turbine (12) as distributed by Turbomach. In addition to monitoring and controlling the above turbine operations, the electronic sequence unit (18) further includes five small indicators (described in more detail below) that comprise the secondary display unit (19) (FIG. 1) and serve as byte indicators. Through these indicators, the electronic sequence unit (18) can signal up to 32 discrete fault modes of the turbine (12), such as overheating, overspeed, and the like.

The primary control unit (16) comprises discrete circuitry that operates to monitor and control the forced air output of the forced air unit (14), electrical output from the generator (13) and turbine operations. The components that comprise the primary control unit (16) will be described in detail below.

The appartaus (10) connects to the electrical system bus (29) of the aircraft through a current limiter (34) and through a main switch relay (36).

The heat sensor unit (27) includes up to four fire detection thermocouple mechanisms disposed where desired about the turbine (12). These fire detectors (27) are connected to the primary control unit (16) as described in more detail below. The fire protection unit (28) comprises a cannister containing fire retardant materials that can be sprayed over the turbine (12) when required in an emergency.

The primary display and input control unit (17) mounts in the cockpit of the aircraft. The display includes a three-digit incandescent readout and back lighting for switches of the input control unit. The input control unit includes a switch to display percent R.P.M. on the display unit, and a switch to display exhaust temperature. Another switch provides for an overspeed test while yet a fourth switch provides for a test of the fire sensing systems. Another switch provides for activating or terminating the turinbe (12) while another switch provides for activating or terminating the generator (13). Finally, two switches are provided to manually operate the fire protection unit (28).

Referring now to FIG. 3, a more detailed description of interconnections between certain of the above units will be provided.

With respect to the electronic sequence unit, (18), the main fuel valve port ground port, low oil pressure switch port ground port, cup motor port (positive), cup motor cup (negative), monopole ports, thermocouple one ports, maximum fuel valve port, start by-pass valve port ground port, hour meter port, high oil temperature switch port and thermocouple two ports connect to the turbine (12) as provided for in the instruction materials that accompany the turbine (12) and the electronic sequence unit (18). The ignition exciter ports connect to the ignition exciter unit (21), the output of which connects to the turbine (12) as provided in the instruction materials noted above.

The modulator valve port of the electronic sequence unit (18) connects to the positive input port of the modulating bleed air valve (22). The negative input of this same valve (22) connects to ground.

The two remaining ground ports of the electronic sequence unit (18) are connected to ground. The temperature output port of the electronic sequence unit (18) connects to the temperature input port of the primary display and input control unit (17). Similarly, the speed output port connects to the speed input port of the primary display and input control unit (17). Similarly, the overspeed test port connects to the overspeed test input port of the primary display and input control unit (17).

The interlock port, fail signal port, ready to load port, bleed select port, economy/maximum port, start signal port, byte individual data port, byte independent clock port, and byte start signal port of the electronic sequence unit (18) each connect to a respective port of the primary control unit (16). In addition, the meter common port of th electronic sequence unit (18) connects to ground and the run power port for the electronic sequence unit (18) connects to appropriate output power ports of the primary control unit (16).

The firewall shut-off switch port, generator fail lamp switch, auxiliary power unit on lamp port, auxiliary power unit fail lamp port, generator select port, fire test port, fire lamp for auxiliary power unit port, and C/B warning light port of the primary display and input control unit (17) connect to these same ports of the primary control unit (16), respectively. The amperage port of the primary display and input control unit (17) connects to the generator shunt (positive) terminal of the generator (13). The ground port of the primary display and input control unit (17) connects to ground. The meter common port of the primary display and input control unit (17) connects to the generator shunt (negative). The auxiliary power unit run signal port connects to the auxiliary power unit run signal port of the primary control unit (16).

The fire extinghisher port connects to the fire protection unit (28). The back lighting port connects to a 5 volt dimmer control (48). The air conditioning master warn port connects to a warning light in the cockpit (49). The C/B fire extinguisher port connects to a cockpit circuit breaker, and the auxiliary pwoer unit C/B port connects to another cockpit circuit breaker. Finally, it may be noted that an alarm speaker (51) may be connected between the auxiliary power unit fire warn lamp port and the C/B warning light port of the primary display and input control unit (17).

Referring now to the primary control unit (16), connections to the remaining ports of this unit will now be described.

The line contacter coil port conencts to the coil (52) of the auxiliary power unit contactor switch (36). The remaining side of this coil (52) connects to ground. The line contactor failure port connects to one terminal of a normally closed and grounded switch contained within the auxiliary power unit contactor (36). The line contactor failure port also connects to the external power disable port. The modulating bleed air valve close switch port connects to the valve position switch associated with the modulating bleed air valve (22). The external power disable port connects to the cathode side of a diode (53), the anode side of which connects to the grounded side of a grounded power contacter coil.

The bleed switch port connects to one terminal of an auxiliary power unit bleed switch (54) mounted in the cockpit area. The air cycle machine overheat detector connects to a normally grounded air cycle machine overheat detector (56). A first fire detector port connects to four normally open thermocouples (57) in parallel. The remaining fire detector port connects to the same terminal of these thermocouples (57). The fuel valve close transfer port connects to the closed transfer port of the fuel shutoff valve (24). Similarly, the fuel valve open transfer port conencts to the opern transfer port of the fuel shuttoff valve (24). The generator overheat detector connects to the generator overheat detector port of the generator (13).

The three generator A terminal ports connect to the shunt field terminal of the generator (13). The three generator B terminal ports connect to the positive generator terminal of the generator (13). The three system ground ports connect to the negative generator terminal of the generator (13).

The equalizer buss port connects to the equalizer buss (58). The generator D terminal port conencts to the D terminal fo the genrerator (13). The power buss C/B ports connect to the power buss circuit breaker (29). Finally, the fuel valve open port connects to the open port of the fuel shutoff valve (24) and the fuel valve close port connects to the close port of the fuel shutoff valve (24).

The fuel pump (23) has its positive terminal connected to the open transfer port of the fuel shutoff valve (24) and its negative terminal connected to ground.

Referring now to FIGS. 4a–d, the primary control unit (16) will now be described in detail.

Figure 4A:
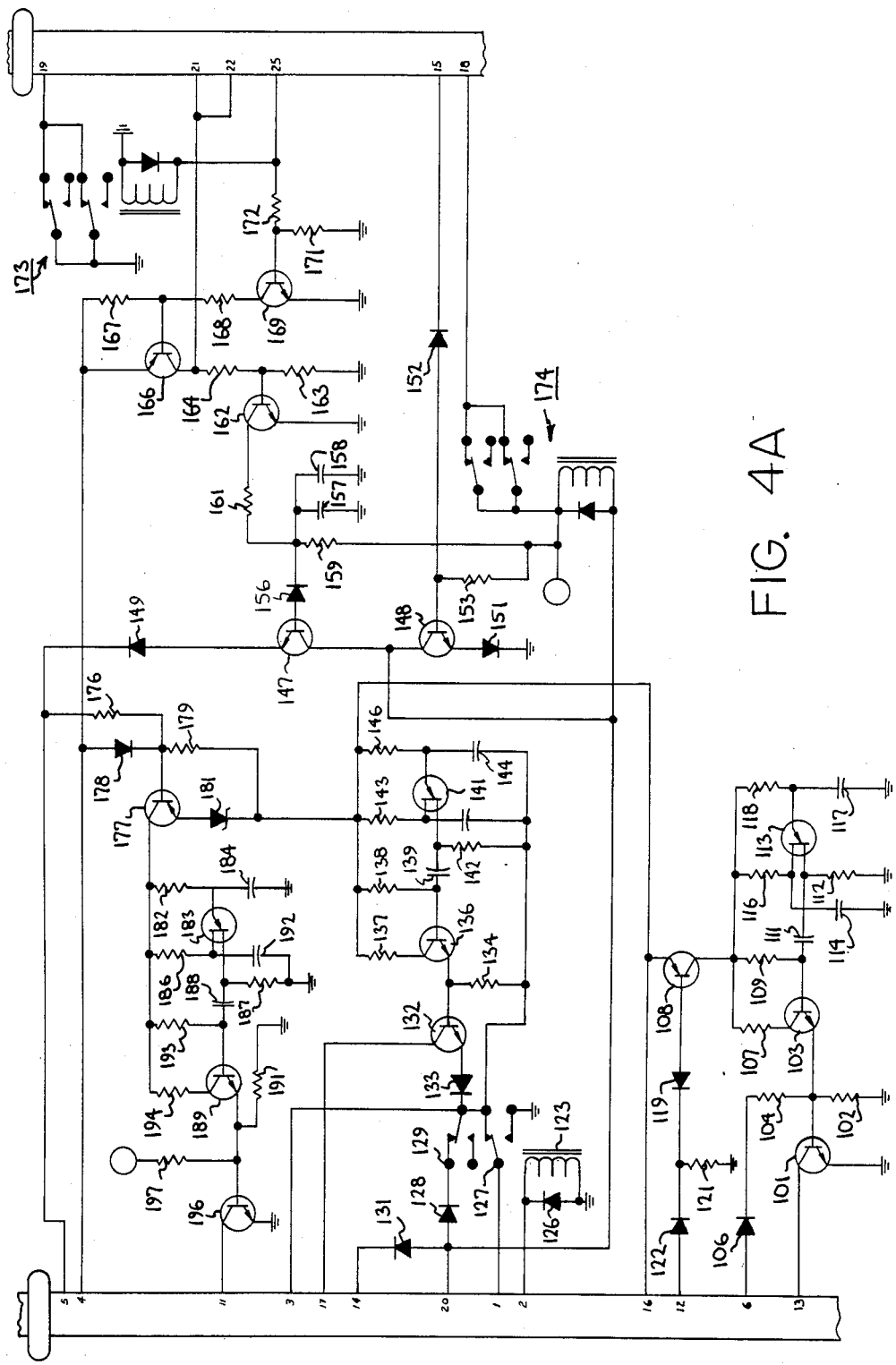
FIGS. 4a–d provide a schematic diagram of the primary control unit.

Referring specifically to FIG. 4a, the auxiliary power unit on lamp port connects to the collecltor of a 2N2222A transistor, the emitter of which connects to ground and the base of which connects through a 1K ohm resistor (102) to ground, to the emitter of another 2N2222A transistor (103), and through a 4.7K ohm resistor (104) to the cathode side of a 1N4148 diode (106), the anode of which connects to the fuel valve open transfer port.

The collector of the second 2N2222A transistor (103) connects through a 4.7K ohm resistor (107) to the collector of a 2N2907 transistor (108). A 100K ohm resistor (109) connects between the base of the second 2N2222A transistor (103) and the collector of the 2N2907 transistor (108). The base of the second 2N2222A transistor (103) also connects through a 0.1 microfarad 35 volt capacitor (111) to a grounded 100 ohm resistor (112) and to the B2 port of a 2N2646 unijunction transistor (113). The emitter of this transistor (113) connects through a 2 microfarad 35 volt capacitor (114) to ground and through a 1K ohm resistor (116) to the collector of the 2N2907 transistor (108) described above. The B1 port of this unijunction transistor (113) connects through a 4.7 microfarad 35 volt capacitor (117) to ground and through a 150K ohm resistor (118) to the collector of the 2N2907 transistor (108) described above.

The base of this latter transistor (108) connects to the anode side of a 1N4005 diode (119), the cathode side of which connects through a 10K ohm resistor (121) to ground and to the cathode side of another 1N4005 diode (122). The anode side of this diode (122) connects to the fuel valve close transfer port. The emitter of the 2N2907 transistor (108) described above connects to the C/B warning port and also to the fire lamp flashing circuitry as will be described below.

The fire test port connects to the solenoid coil (123) of a two pole double throw relay switch, such as part No. 2K-2C-126 as manufactured by Hi-G Company, Inc. (124). A 1N4005 diode (126) connects across the solenoid winding (123). The fire detector port connects to one pole of this relay switch (124), and the generator overheat detector port connects through another 1N4005 diode (128) to the remaining pole (129) of this same relay (124). The generator overheat detector port also connects through a 1N4005 diode (131) to the firewall shutoff switch port.

The opposing poles representing the normally closed connections of the relay (124) are connected in common and also to the remaining fire detector port. These poles are also connected to the fire warning circuitry as described in more detail below.

The fire lamp port connects to the collector of a 2N2222A transistor (132), the emitter of which connects through a 1N4005 diode (133) to the relay (124).

The base of this transistor (132) connects through a 1K ohm resistor (134) to the relay (124) and also to the emitter of another 2N2222A transistor (136). The collector of this latter transistor (136) connects through a 10K ohm resistor (137) to the warn C/B port. The base of this transistor (136) connects through a 1 mega ohm resistor (138) toward C/B port, and also through a 0.1 microfarad capacitor (139) to B2 port of a 2N2646 unijunction transistor (141). The B2 port of this transistor (141) connects through a 100 ohm resistor (142) to the relay (124). The B1 port of this transistor (141) connects through a 1K ohm resistor (143) to the warn C/B port, and the emitter connects through a 3 microfarad capacitor (144) to the relay (124) and through a 150K ohm resistor (146) to the warn C/B port.

The generator overheat detector port also connects to the collectors of a pair of 2N2222A transistors (147 and 148). The emitter of the first transistor (147) connects through a 1N4005 diode (149) to the modulating bleed air valve switch port. The emitter of the second 2N2222A transistor (148) connects through a 1N4005 diode (151) to ground. The base of this same transistor (148) connects through another 1N4148 diode (152) to the air cycle machine overheat detector port. The base of this transistor (148) also connects through a 10K ohm resistor (153) to the central tap of a 2099-50-1 iron core inductor (154) (FIG. 4d).

The base of the first 2N2222A transistsor (147) connects through a 1N4744 Zenor diode (156) to two parallel connected and grounded 47 microfarad 25 volt capacitors (157 and 158). The Zenor diode (156) also connects through a 20K ohm resistor (159) to the central tap of the inductor (154) (FIG. 4d) described above, and through a 100 ohm resistor (161) to the collector of a 2N2222A transistor (162), the emitter of which connects to ground. The base of this latter transistor (162) connects through a 470 ohm resistor (163) to ground and through a 4.7K ohm resistor (164) to the collector of a 2N2907 transistor (166). The emitter of this transistor (166) connects to the bleed switch port and also through a 470 ohm resistor (167) to the base. The collector of this transistor (166) connects to the bleed air select port and the economy/maximum port. The base of this transistor (166) also connects through a 4.7K ohm resistor (168) to the collector of an emitter grounded 2N2222A transistor (169).

The base of this latter transistor (169) connects through a 470 ohm resistor (171) to ground and through a 4.7K ohm resistor (172) to the ready to load port and also to the solenoid winding of a double pole double throw relay (173), such as part No. 2K-2C-126 as manufactured by Hi-G Company, Inc. Both normally closed poles of this relay (173) connect to the external power disable port.

Two of the 2N2222A transistors (147 and 148) noted above have their collectors connected to both the general overheat detector port and to the solenoid coil of a double pole double throw relay (174) such as part No. 2K-2C-126 as manufactured by Hi-G Company, Inc. The remaining terminal of this relay coil connects to the central tap of the iron core inductor (154) (FIG. 4d) described above. Both normally closed poles of this relay (174) are connected to the interlock port.

With continued reference to FIG. 4a, the bleed modulator valve close switch port connects through a 10K ohm resistor (176) to the base of a 2N2907 transistor (177). The bleed switch connects through a 1N4148 diode (178) to the base of this transistor (177). The base of this transistor (177) also connects through a 470K ohm resistor (179) to a Zenor diode (181) such as part No. 1N4733, the remaining terminal of which connects to the emitter of the transistor (177). The collector of this transistor (177) connects through a 150K ohm (182) to the gate of a 2N2646 transistor (183) and also through a 3 microfarad capacitor (184) to ground. The D1 port of this transistor (183) connects through a 1K ohm transistor (186) to the collector of the 2N2907 transistor (177). The D2 port of the 2N2646 transistor (183) connects through a 100 ohm resistor (187) to ground and through a 0.1 microfarad capacitor (188) to the base of a 2N2222A transistor (189), the emitter of which connects through a 1K ohm resistor (191) to ground. The D1 port of the 2N2646 transistor (183) also connects through a 1.0 microfarad capacitor (192) to ground.

The base of the 2N2222A transistor (189) connects through a 1 mega ohm resistor (193) to the collector of the 2N2907 transistor (177), which collector also connects through a 4.7K ohmn resistor (194) to the collector of the 2N2222A transsistor (189) noted above. The emitter of this transistor (189) connects to the base of another 2N2222A transistor (196), the emitter of which connects to ground and the collector of which connects to the fail lamp port. The base of this 2N2222A transistor (196) also connects through a 4.7K ohm resistor (197) to the APU fail port depicted on FIG. 4b below.

Figure 4B:
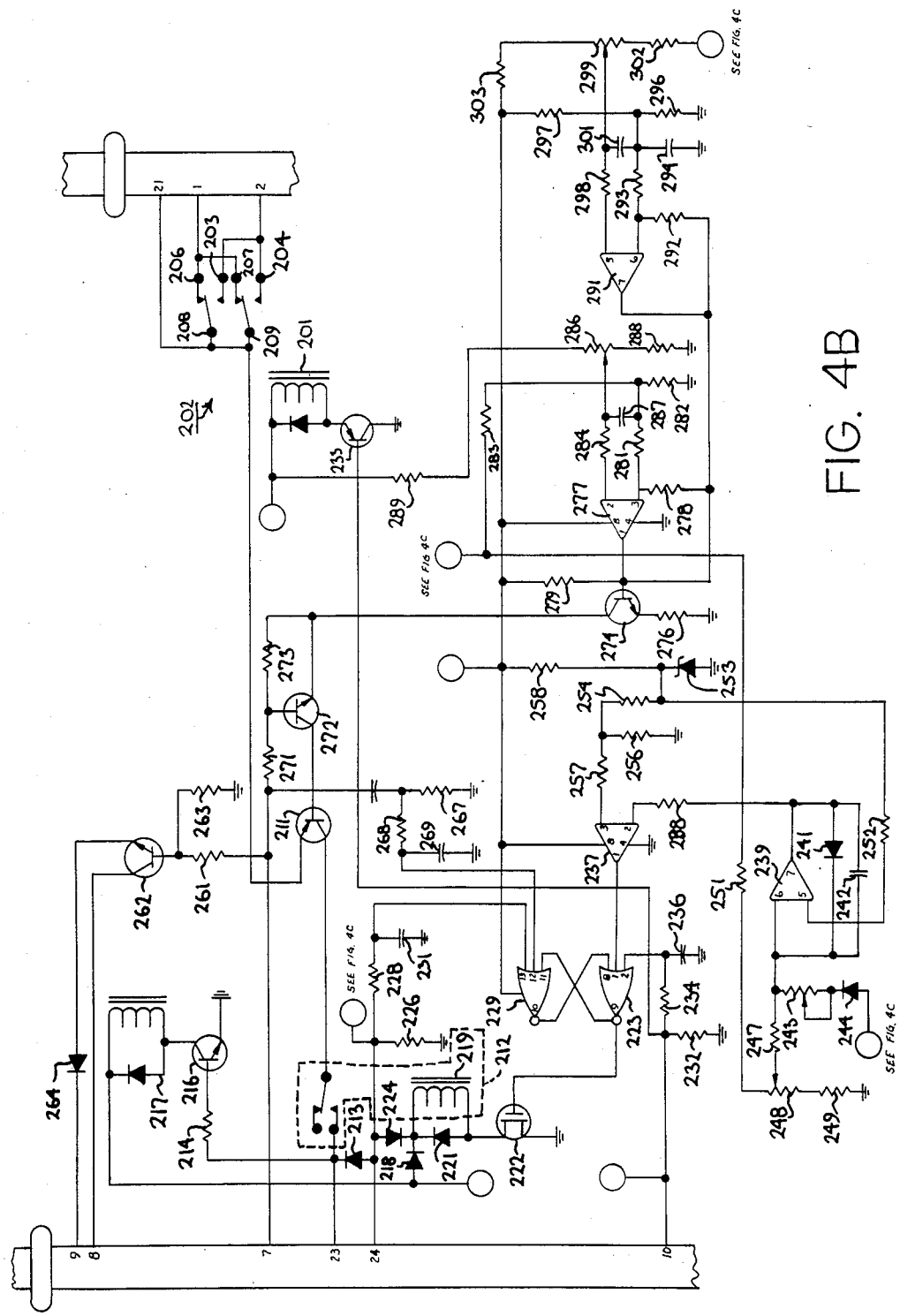

Referring now to FIG. 4b, the detailed description of the primary control unit (16) will continue.

The center tap of the inductor (154) (described above with respect to FIG. 4d) connects to the coil winding (201) of a two pole double throw relay (202) such as a Struthers-Dunn part No. FC215-P. Both normally open poles (203 and 204) connect to the fuel valve open port. Both of the normally closed poles (206 and 207) connect to the fuel valve closed port. The common pole (208 and 209) of the relay (202) connects to the power buss C/B port and to the emitter of a 7904P transistor (211). The collector of this transistor (211) connects to the common pole of a normally open relay switch (212) such as part No. KC2JA.

The normally open pole of this relay (212) connects to the line contactor coil port and through a 1N5061 diode (213) to the start signal port, and through a 4.7K ohm resistor (214) to the base of a 2N2222A transistor (216). The emitter of this transistor (216) connects to ground and the collector connects to the coil of a two pole double throw relay (217) such as a Hi-G Company, Inc. part No. 2K-2C-126. The remaining coil lead of this relay (217) connects to the ready to load port as described above with respect to FIG. 4a. This same ready to load connection connects through a 1N4005 diode (218) to the solenoid coil (219) of the relay switch (212) described above. This same solenoid coil (219) has a 1N4005 diode (221) connected across its terminals, and the coil (219) connects to the drain of a VN67 transistor (222). The source of this transistor (222) connects to ground and the gate connects to the output of a three input NOR gate (223) such as an RCA part No. CD 4025BF.

Referring back to the relay switch (212), the coil (219) also connects through a 1N4005 diode (224) to the start signal port. This start signal port also connects through a 2.2K ohm resistor (226) to ground, to a 39 ohm resistor (227) (see FIG. 4c), and through a 220K ohm resistor (228) to one input of a second three input NOR gate (229), the same input of which also connects to ground through a 0.001 microfarad capacitor (231).

The output of the first NOR gate (223) connects to one input of the second NOR gate (229) and the output of the second NOR gate (229) connects to one input of the firs NOR gate (223). The APU fail port connects through a 2.2K ohm resistor (232) to ground, to the base of a 7904P transistor (233), and through a 220K ohm resistor (234) to a second input of the first NOR gate (223). This same input of this NOR gate (223) also connects to ground through a 0.001 microfarad capacitor (236)., The collector of the 7904P transistor (233) connects to ground and the collector connects to the two pole double throw relay (201) described above.

The final input to the first NOR gate (223) connects to the output of an operational amplifier (237) such as a National Semiconductor LM1558J. The inverting input of this operational amplifier (237) connects through a 10K ohm resistor (238) to the output of a second operational amplifier (239). A feedback 1N4148 diode (241) connects between the output and inverting input of this operational amplifier (239), as does a 1 microfarad 35 volt capacitor (242). The noninverting input of this operational amplifier (239) also connects through a series connected 10K ohm variable resistor (243) and a 1N4148 diode (244) to the output of an operational amplifier (246) (FIG. 4c) such as an RCA part No. CA316OE. The inverting input of the second operational amplifier (239) also connects through a 10K ohm resistor (247) to the attenuation node of a 10K ohm variable resistor (248) that has one terminal connected to ground through a 2.2K ohm resistor (249) and has the remaining terminal connnecting through a 15K ohmn resistor (251) to the generator B terminal port (as shown on FIG. 4c).

The noninverting input of this operational amplifier (239) connects through a 10K ohm resistor (252) to a grounded 1N4733 Zenor diode (253). The latter resistor (252) also connects through a 1K ohm resistor (254) to a grounded 1K ohm resistor (256) and through a 10K ohm resistor (257) to the noninverting input of the first operational amplifier (237) described above. The Zenor diode (253) last mentioned connects through a 1.2K ohm resistor (258) to the emitter of a 7904N transistor (259) (FIG. 4d). The generator select terminal port connects through a 4.7K ohm resistor (261) to the base of a 2N2222A transistor (262), the base of which also connects through a 1K ohm resistor (263) to ground. The collector of this transistor (262) connects to the generator fail lamp port and the emitter connects through a 2N4005 diode (264) to the line contactor fail port.

The generator select port also connects through a 1 microfarad 35 volt capacitor (266) to a grounded 22K ohm resistor (267) and through a 220K ohm resistor (268) to the third input of the second three input NOR gate (229) described above. This input also connects to ground trough a 0.0001 microfarad capacitor (269).

Finally, the generator select port connects through a 4.7K ohm resistor (271) to the base of a 2N2222A transistor (272). The base of this transistor (272) also connects through a 1K ohm resistor (273) to the emitter thereof, and also the collector of another 2N2222A transistor (274). The collector of the first transistor (272) connects to the base of a 790P transistor (211) described above.

The emitter of the 2N2222A transistor (274) mentioned aboe connects through a 10K ohm resistor (276) to ground. The base of this transistor (274) connects to the output of an operational amplifier (277) such an LM193H. The output of this operational amplifier (277) connects through a 390K ohm resistor (278) to the noninverting input thereof, and also through a 2.2K ohm resistor (279) to the emitter of the 7904N transistor (259) (FIG. 4d) described above.

Figure 4C:
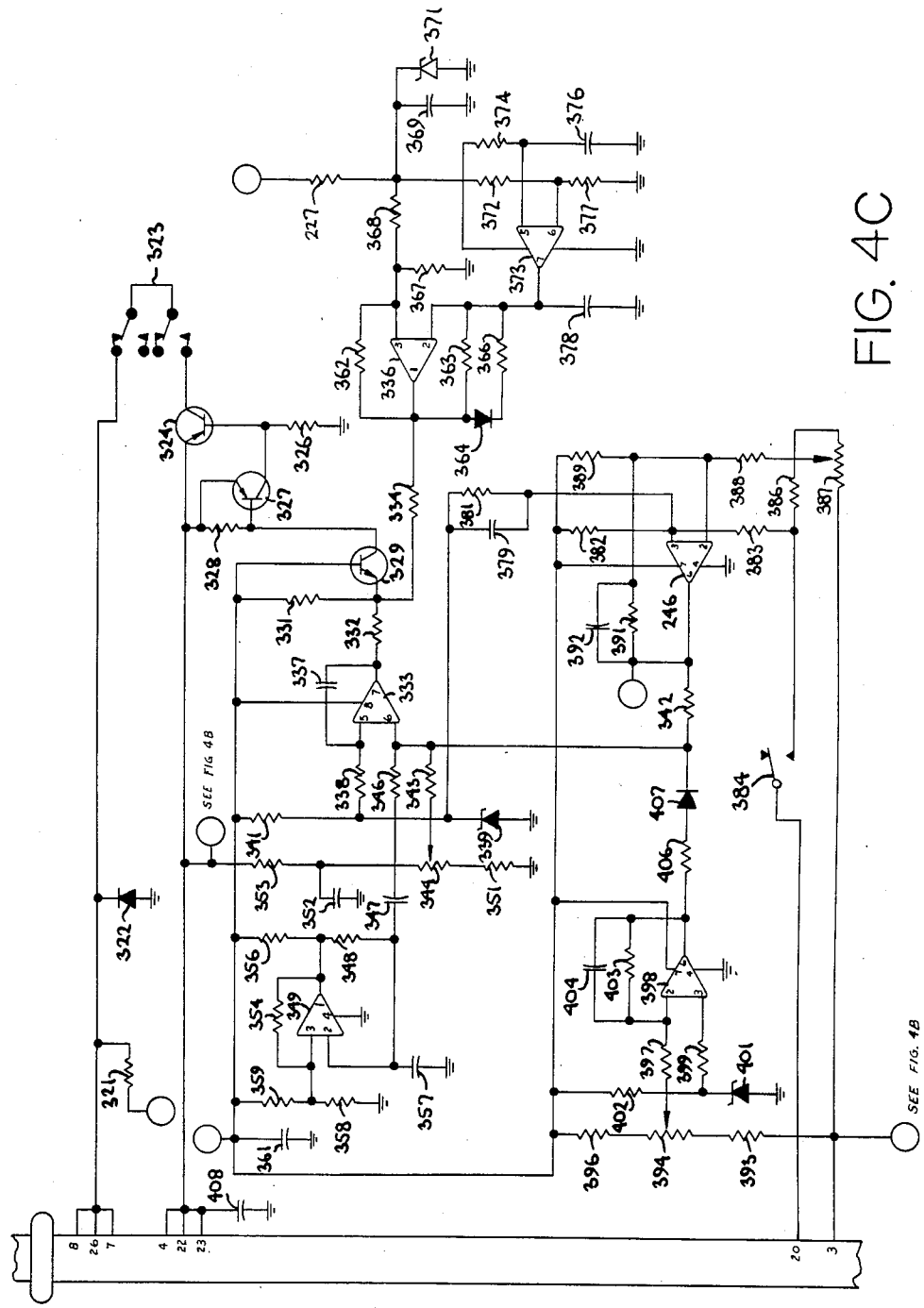
Figure 4D:
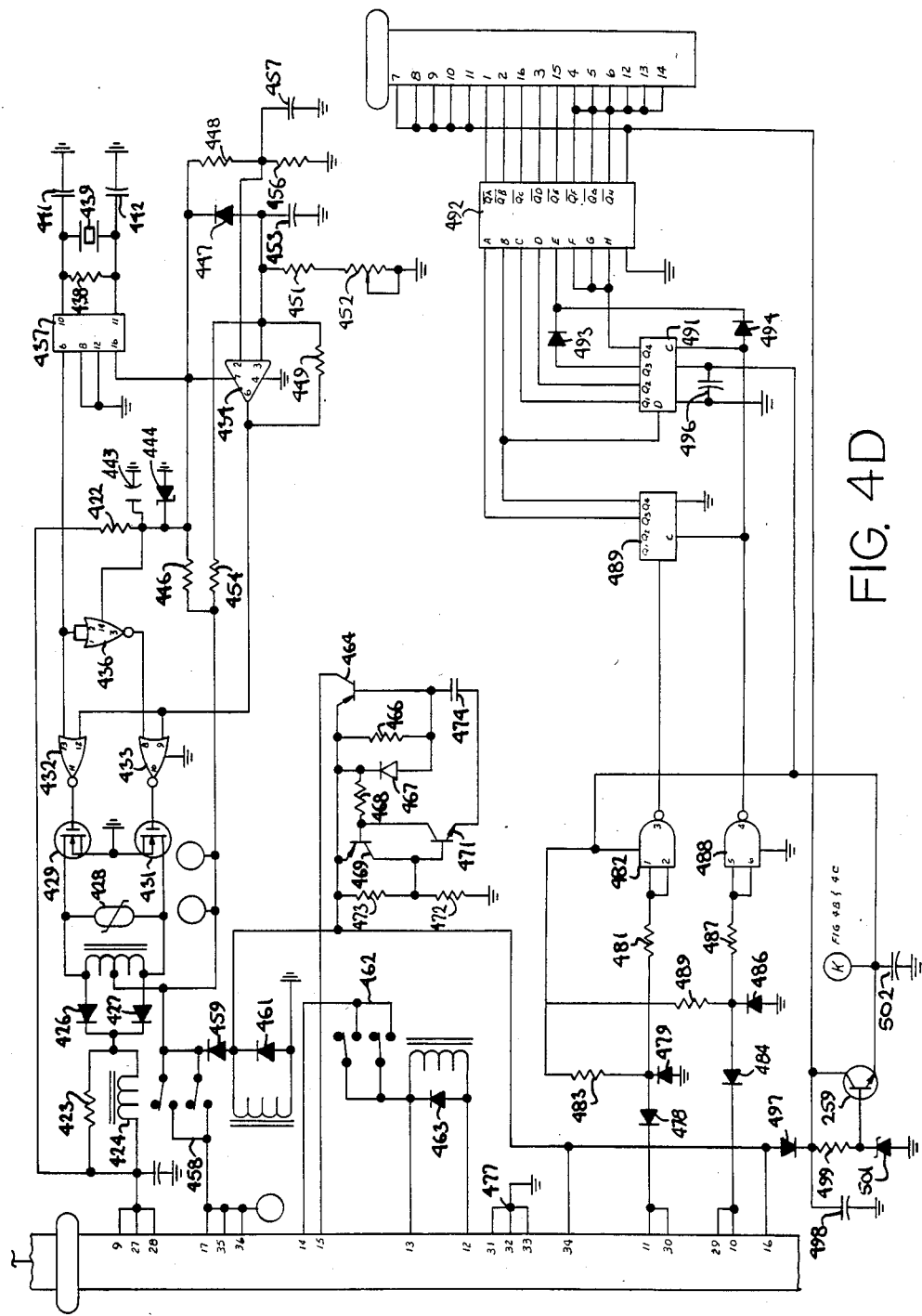

The noninverting input of this operational amplifier (277) connects through a 10K ohm resistor (281) to a grounded 2K ohm resistor (282) and through a 2.2K ohm resistor (283) to the generator B terminal port as depicted in FIG. 4c. The inverting input of this operational amplifier (277) connects through a 10K ohm resistor (284) to the variable attenuation terminal of a 5K variable resistor (286) and also through a 0.0001 microfarad capacitor (287) to the grounded resistor (282) described above. One terminal of the variable resistor (286) connects through a 2K ohm resistor (288) to ground, and the remaining terminal connects through a 2.2K ohm resistor (289) to the central tap of the iron core inductor (154) (FIG. 4d) described above.

The output of the operational amplifier (277) described above also connects to the output of another operational amplifier (291) such as an LM193H. the output of this operational amplifier (291) connects through a 2M ohm resistor (292) to the noninverting input thereof, which input also connects through a 10K ohm resistor (293) to a parallel connected and grounded 4.7 microfarad 35 volt capacitor (294) and a 1.2K ohm resistor (296). This grounded resistor (296) also connects through a 2.2K ohm resistor (297) to the 7904N transistor (259) (FIG. 4d) described above. The inverting input of the operational amplifier (291) connects through a 10K ohm resistor (298) to the variable attenuation terminal of a 5K ohm variable resistor (299) and through a 2.2 microfarad 35 volt capacitor (301) to the grounded resistor (296). One terminal of the variable resistor (299) connects through a 1K ohm resistor (302) to the generator D terminal port as shown on FIG. 4c and the remaining terminal connects through a 2.2K ohm resistor (303) to the 7904N transistor (259) (FIG. 4d) described above.

Referring now to FIG. 4c, the detailed description of the primary control unit (16) will continue.

The three generator A terminal ports connect through a 10 ohm resistor (221) to the power buss C/B terminals as shown on FIG. 4d. The generator A terminal ports also connect through a 1N389OR diode (222) to ground. Finally, the generator A terminal ports connect to one normally open pole of a two pole double throw relay such as a KCT2JA (223). The remaining normally open pole of this relay (223) connects to the collector of a 2N6286 transistor (224), the emitter of which connects to the generator B terminal ports. The base of this transistor (224) connects to ground through a 1K ohm resistor (226) and also to the collector of a 2N2907 transistor (227), the emitter of which also connects to the three generator B terminal ports.

The base of this transistor (227) connects to the generator B terminal ports through a 470 ohm resistor (228) and also to the collector of a 2N3440 transistor (229), the base of which connects to the 7904N transistor (259) (FIG. 4d) as described above. The emitter of this transistor (229) connects to the base thereof through a 470 ohm resistor (231), through a 2.2K ohm resistor (232) to a first LM193H operational amplifier (233), and through a 2.2K ohm resistor (234) to the output of a second LM193H operational amplifier (236). The noninverting input of the first operational amplifier (233) connects through a 0.002 microfarad capacitor (237) to the output thereof. The noninverting input also connects through a 56K ohm resistor (238) to a grounded 1N4733 Zenor diode (239) and through a 470 ohm resistor (341) to the emitter of the 7904N transistor (259) (FIG. 4d) as described above.

The inverting input of this operational amplifier (233) connects through a 100K ohm resistor (342) to the anode side of a diode (244) (FIG. 4b), through a 56K ohm resistor (343) to the adjustable attenuating terminal of a 20K ohm variable resistor (344), and through a series connected 470K ohm resistor (346) and 1 microfarad 35 volt capacitor (347) to a 10K ohm resistor (348) that connects to the output of a third LM193H operational amplifier (349). One terminal of the variable resistor (344) described last above connects through a 1.5 K ohm resistor (351) to ground, and the remaining terminal connects both to a grounded 0.001 microfarad capacitor (352) and through a 10K ohm resistor (353) to the three generator B terminal ports.

The output of the third operational amplifier (349) described with respect to this FIG. 4c connects to the noninverting input thereof through a 10K ohm resistor (354) and also through a 2.2K ohm resistor (356) to the emitter of the 7904N transistor (259) (FIG. 4d) described above. The inverting input of this operational amplifier (349) connects to ground through a 0.0015 microfarad capacitor (357). The noninverting input thereof connects to ground through a 10K ohm resistor (358) and through a 10K ohm resistor (359) to the emitter of the 7904N transistor (259) (FIG. 4d) described above, which emitter also connects through a 47 microfarad 25 volt capacitor (361) to ground.

With reference to the second operational amplifier (336) described above with respect to this FIG. 4c, the output theereof connects to the noninverting input thereof through a 10K ohm resistor (362). The output also connects to the inverting input through a 10K ohm resistor (363) and through a series connected 1N414B diode (364) and a 3.3K ohm resistor (366) to the inverting input. The noninverting input connects through a 10K ohm resistor (367) to ground and through a 10K ohm resistor (368) to a parallel grounded 47 microfarad 25 volt capacitor (369) and 1N4735 Zenor diode (371). This latter resistor (368) also connects to a 39 ohm resistor (227) as described above with respect to FIG. 4b. Finally, this 10K ohm resistor (368) also connects through a 10K ohm resistor (372) to the invering input of a fourth LM193H operational amplifier (373), and through a 220K ohm resistor (374) to the noninverting input thereof.

The noninverting input of this fourth operational amplifier (373) also connects to ground through a 4.7 microfarad 35 volt capacitor (376)) and the inverting input connects to ground through a 22K ohm resistor (377). The output of this fourth operational amplifier (373) connects to ground through a 0.0015 microfarad capacitor (378) and also to the inverting input of the second operational amplifier (336) described above with respect to this FIG. 4c.

The Zenor diode (339) described above with respect to the first operational amplifier (333) described in this FIG. 4c also connects to a parallel combined 0.0015 microfarad capacitor (379) and a 470K ohm resistor (381) to the noninverting input of an RCA CA3160E operational amplifier (246) mentioned above with respect to the description of FIG. 4b. The noninverting input of this operational amplifier (246) also connects through a 2.2K ohm resistor (382) to the emitter of the 7904N transistor (259) (FIG. 4d) described above and through a 15K ohm resistor (383) to a single pole single throw switch (384) such as a 2K-2C-126, which switch connects to the equalizer buss port.

The latter mentioned resistor (383) also connects through a 22 ohm resistor (386) to one terminal of a 1K ohm variable resistor (387), the common terminal which connects to the generator D terminal port. The variable attentuation terminal of this variable resistor (387) connects through a 15K ohm resistor (388) to the inverting input of the operational amplifier (246), through a 10K ohm resistor (389) to the emitter of the 7904N transistor (259) (FIG. 4d) described above, and through a parallel connected 470K ohm resistor (391) and a 0.0015 microfarad capacitor (392) to the output of the operational amplifier (246).

The generator D terminal port connects through a 10K ohm resistor (393) to one terminal of a 5K ohm variable resistor (394), the remaining terminal of which connects through a 15K ohm resistor (396) to the emitter of the 7904N transistor (259) (FIG. 4d) described above. The variable attenuation terminal of the variable resistor (394) connects through a 10K ohm resistor (397) to the inverting input of a second RCA CA3160E operational amplifier (398).

The noninverting input of this operational amplifier (398) connects through a 10K ohm resistor (399) and through a 10K ohm resistor (401) to ground and through a 3K ohm resistor (402) to the emitter of the 7904N transistor (259) (FIG. 4d) described above. The inverting input of this operational amplifier (398) has a parallel connected 390K ohm resistor (403) and a 1 microfarad 35 volt capacitor (404) connected between it and the output thereof. The output connects through a seies connected 47K ohm resistor (406) and a 1N4148 diode (407) to the inverting input of the first LM293H (333) operational amplifier as described above with respect to this FIG. 4c. The three generator B terminal ports connect to ground through a 5 microfarad capacitor (408).

Referring now to FIG. 4d, this detailed description of the primary control unit will continue.

The three ESU power ports connect to ground through a 50 microfarad capacitor (421), to a 1K ohm resistor (422), and to a parallel connected 1.2K ohm resistor (423) and an iron core inductor (424) such as part No. 2099-46-1. The latter two elements (423 and 424) connect to the cathodes of a USO 945 diode pack (426 and 427). The anode side of each diode (426 and 427) connect to the end terminals of the iron core inductor (154) described above. A V82ZA12 transorber (428) connects in parallel across the inductor (154).

One terminal of the inductor (154) also connects to the drain of an RCA 923B transistor (429), while the remaining inductor terminal connects to the drain of a second RCA 9230B transistor (431). The source terminals of each transistor (429 and 431) are connected to ground. The gate of the first transistor (429) connects to the output of a two input inverting NOR gate (432) such as an RCA CD4001 BF while the gate of the second transistor (431) connects to the output of a second two input inverting NOR gate (433). One input of both NOR gates (432 and 433) connect to the output of an RCA CA3160E operational amplifier (434). The remaining input of the first NOR gate (432) connects to both inputs of a third inverting NOR gate (436) and also to the output of an oscillator circuit. The output of the third NOR gate (436) connects to the remaining input of the second NOR gate (433).

The oscillator circuit noted above comprises an RCA CD4060BF oscillator (437), which oscillator has a 15 mega ohm resistor (438) and a 10K hertz crystal (439) connected in parallel across pins 10 and 11 thereof. Pin 10 additionally connects to ground through a 33 microfarad capacitor (441) and pin 11 similarly connects to ground through a 33 microfarad capacitor (442).

The 15 mega ohm resistor (422) described above with respect to the electronic sequence unit's power ports has its remaining terminal connected to ground through a parallel connected 47 microfarad 25 volt capacitor (443) and a 1N4739 Zenor diode (444). In addition, this resistor connects through a 1K ohm resistor (44²0 to the central tap of the iron core inductor (154) described above to pin 16 of the oscillator (437), through a 1N4148 diode (447) to the noninverting input of an RCA CA3160E operational amplifier (434) described above and through a 100K ohm resistor (448) to the inverting input of this same operational amplifier (434). The noninverting input of this operational amplifier (434) connects to its output through a 100K ohm resistor (449), to ground through a series connected 3.3K ohm resistor (451) and 5K ohm variable resistor (452), to ground through a 0.0015 microfarad capacitor (453), and through an 8.2K ohm resistor (454) to the central tap of the iron core inductor (154) described above. The inverting input additionally connects to ground through a parallel connected 100K ohm resistor (456) and a 1 microfarad 35 volt capacitor (457).

The three power buss C/B ports connect to two poles of a double pole double throw relay (458) such as a 2K-2C-126. The common poles of this relay (458) are connected in common to the central tap of the iron core inductor (154) described above and also through an MR822 diode (459) to the relay winding, which winding has a 1N4005 diode (461) connected in parallel across it.

The fan port connects to two terminals of a double pole double throw switch (462) such as a 2K-2C-126. The opposing terminals of this relay (462) connect to the fan FWR port, which port also connects to one terminal of the relay coil (462). The remaining terminal of the coil connects to the fan switch port, and a 1N4005 diode (463) connects in parallel across the coil. The electronic sequence unit start signal port connects to the collector of an MJE702 transistor (464), the emitter of which connects to the relay coil of a relay (458) described above and which is connected to the power buss C/B ports.

The emitter of this transistor (464) also connects through a 10K ohm resistor (466) to the base thereof and through 1N4148 diode (467) to the base thereof. The emitter of this transistor (464) connects through a 270 ohm resiistor (468) to the base of a 2N2907 transistor (469), the collector of which connects to the base of a 2N2222A transistor (471). The collector of this latter transistor (471) connects to the base of the second mentioned transitor (469). The base of the 2N2222A transistor (471) also connects through a 10K ohm resistor (472) to ground and through a 10K ohm resistor (473) to the APU run signal port. The base of the first mentioned transistor (464) also connects through a 47 microfarad capacitor (474) to the emitter of the third mentioned transistor (471), with the latter emitter also connecting to ground through a 2.2K ohm resistor (476).

The three system ground ports connect to ground as indicated by the numeral 477. The external byte power port connects to the power buss C/B relay (458) as described above. The byte data port connects through a 1N4148 diode (478) to a grounded 1N4148 diode (479) and through a 47K ohm resistor (481) to both inputs of a two input NAND Schmidt trigger (482) such as an RCA part No. CD4093BF, and through a 470 ohm resistor (483) to pin 14 of the two input NAND Schmidt trigger (482).

The byte clock port connects through a 1N4148 diode (484) to a grounded 1N4148 diode (486), through a 47K ohm resistor (487) to both inputs of a second two input NAND Schmidt trigger (488), and through a 70 ohm resistor (489) to pin 14 of the first two input NAND Schmidt trigger (482).

The input of the first two input NAND Schmidt trigger (482) connects to the data port of a four bit latch (489) such as an RCA CD4015 and the output of the second two input NAND Schmidt trigger (488) connects to the clock port of the above mentioned latch (489) and of a second latch (491). The Q3 port of the first latch (489) connects to the A input port of an eight port inverter (492). The Q4 port of the first latch (489) conects to both the B port of this inverter (492) and to the data port of the second latch (491).

The Q1 and Q2 ports of the second latch (491) connect to the C and D ports of the inverter (492), respectively, The Q3 port of the latch (491) connects through a 1N4148 diode (493) to the E port of the inverter (492) and the output of the second two input NAND Schmidt trigger (488) also connects through a 1N4148 diode (494) to the E port of the inverter (492). The Q4 port of the second latch (491) connects to the F, G and H ports of the inverter (492). A 0.01 microfarad capacitor (496) connects across pins 8 and 16 of the second latch (491).

The APU run signal port connects through a 1N5061 diode (497) to a grounded 10 microfarad 35 volt capacitor (498), through a 820 ohm resistor (499) to the base of the 7904N transistor (259) described above, and to the collector of that same transistor (259). The base of this transistor (259) connects to ground through a 1N4742 Zenor diode (501). The emitter of this transistor (259) connects to ground through a 47 microfarad 25 volt capacitor (502), to pin 14 of the first two input NAND Schmidt trigger (482) described above, and to pin 16 of the second latch (491) described above. The collector of this transistor (259) connects to pin 10 of the inverter (492) described above. The collector of this transistor (259) connects to pin 10 of the inverter (492) described above and to the bit 1 (plus) through bit 5 (plus) data signal ports. The QA through QE ports of the inverter (492) connect to the bit 5 (negative) set through bit 1 (negative) set data ports, and the QF through QH ports are connected in common and to the bit 1 (negative) reset through bit 5 (negative) reset data prots. These latter signal ports are utilized to control the secondary display unit (19) that operates to provide information regarding various fault modes.

Figure 5A:
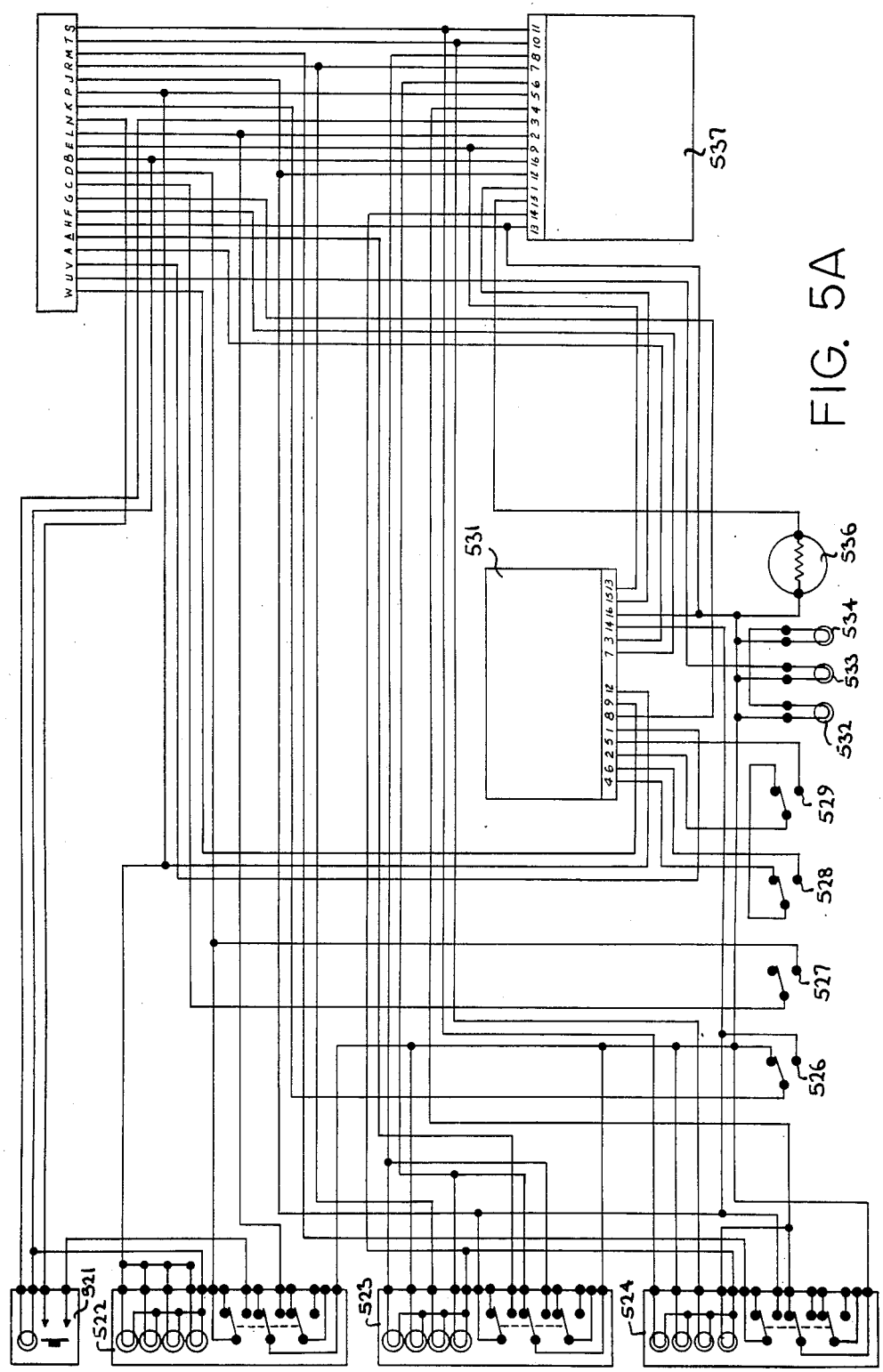
FIGS. 5a–c provide a schematic diagram of the display unit and input control unit.

Referring now to FIG. 5a, the description of the primary display and input control unit (17) will now be described in general.

The primary display and input control unit (17) includes generally a fire extinguisher switch (521) such as part No. 513-0101-604 as manufactured by Dial-Light Co. This switch includes a normally open push button switch and a lamp. This unit further includes a second fire control switch (522) and includes a triple throw switch and four illumination lamps. One pole of the triple throw switch is connected to the switch of the fire extinguisher switch (521) described above. Through the configuration put forth above, both switches (521 and 522) must be closed in order to operate the fire protection unit (28).

The primary display and input control unit (17) also includes a generator on/off switch (523), an auxiliary power unit on/off switch (524), an overspeed test switch (526), a fire test switch (527), a temperature display control switch (528) and an RPM display control switch (529). Both the generator on/off switch (523) and the APU on/off switch (524) include triple throw switches with four illumination lamps. The generator on/off switch (523) allows remote operation of the generator (13), and the auxiliary power unit on/off switch (524) allows remote operation of the turbine (12).

The overspeed test switch (526), the fire test switch (527), the temperature switch (528) and the RPM switch (529) are each single pole single throw switches. The overspeed test switch operates to test the ESU O/S circuits and both the generator on/off switch (523) and the auxiliary power unit on/off switch (524). Similarly, the fire test switch (527) operates to illuminate a fire warning lamp in the fire control switch (522).

The temperature and RPM switches (528 and 529) connect to the indicated terminals of the meter unit (531) which is indicated in block format on FIG. 5a and which will be described below in more detail with respect to FIG. 5c. Three back lights (532, 533 and 534) are provided, and may be supplied by use of part No. BDP62. Finally, a photo cell (536), such as part No. C1905L, may be included to sense the presence or absence of light in the cockpit and hence to control the degree of energization of various display lamps and other display indicia. The power supply (537) is indicated in block format form and will be described in more detail below with respect to FIG. 5b.

Figure 5B:
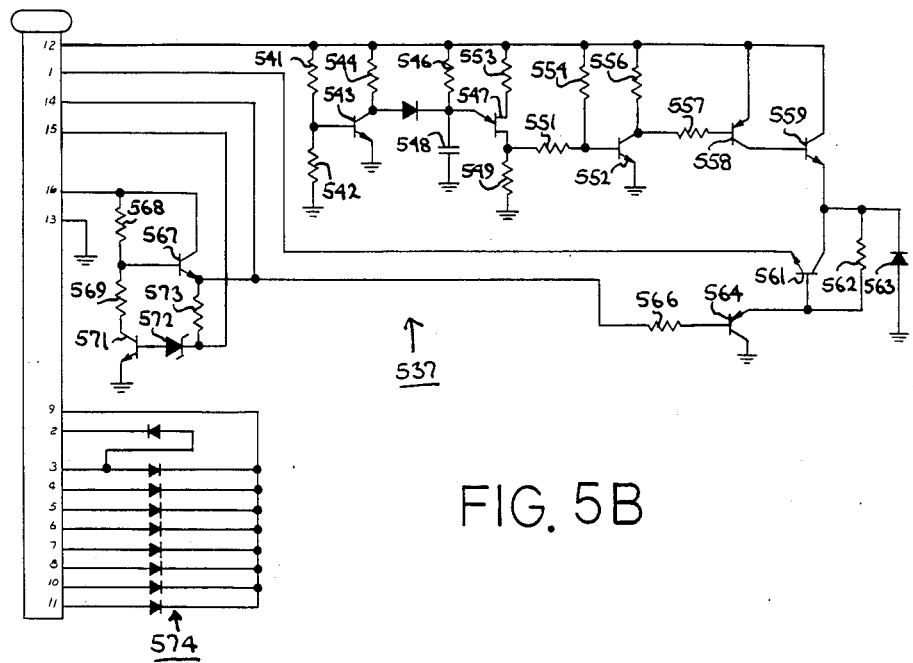

Referring now to FIG. 5b, a positive 28 volt switched output port connects through a 47K ohm resistor (541) through a 1K ohm ressistor (542) to ground and to the base of a 2N2222A transistor (543), which transistor has its emitter connected to ground. The collector of this transistor (543) connects through a 1 mega ohm resistor (544) to the positive 289 voltt switched terminal, which terminal also connects through a 1 mega ohm resistor (546) to the base of a 2N2646 transistor (547) and through a 0.01 microfarad capacitor (548) to ground. The B2 port of this transistor (547) connects through a 100 ohm resistor (549) to ground and through a 150 ohm resistor (551) to the base of a 2N2222A transistor (552).

The B2 port of the 2N2646 transistor (547) connects through a 1K ohm resistor (553) to the positive 28 volt switched port, which port also connects through a 470K ohm resistor (554) to the base of the 2N2222A transistor (552) and also through a 4.7K ohm resistor (556) to the collector of that same transistor (552). The emitter of that transistor (552) connects to ground, and the collector connects through a 1K ohm resistor (557) to the base of a 2N2907 transistor (558). The emitter of this transistor (558) connects to the positive 28 volt switched port and to the collector of a 2N3879 transistor (559), the base of which connects to the collector of the 2N2907 transistor (558).

The emitter of the 293879 transistor (559) connects to the collector of a 2N3879 transistor (561), through a 2509 ohm resistor (562) to the base of that transistor (561), and to a grounded 1N4005 diode (563). The emitter of the 2N3879 transistor (561) connects to a positive 5 volt dimmer port and the base of that transistor (561) connects to the emitter of a 2N2907 transistor (564), the collector of which attaches to ground and the base of which connects through a 1K ohm transistor (566) to both a positive 28 volt dimmer port and the emitter of a 2N3879 transistor (567).

The collector of this transistor (567) connects to a positive 28 volt supply port, which port also connects through a 470 ohm resistor (568) to the base of the transistor (567) and through a 470 ohm resistor (569) to the collector of a 2N2222A transistor (571). The emitter of this transistor (571) connects to ground and the base connects through a 1N4731 Zenor diode (572) to the photocell port and also through a 100K ohm resistor (573) to the emitter of the 2N3879 transistor (567).

The ground port connects to ground. A plurality of 1N4005 diodes are depicted by the numeral 574 and are connected in a parallel format to a variety of ports for use in connection to various components as indicated in FIG. 5a.

Figure 5C:
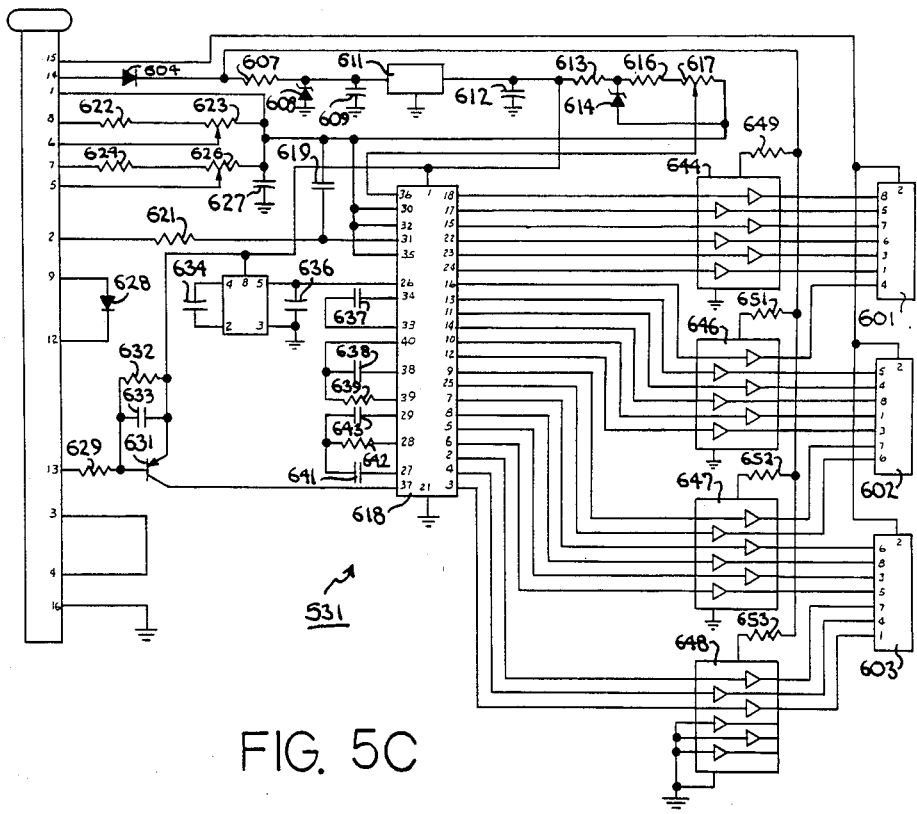

Referring now to FIG. 5c, the meter unit (531) will now be described in detail.

The 5 volt dimmer port connects to pin 2 of each of the three seven segment display unit (601, 602 and 603) such as part no MD640 as manufactured by Colt Industries. The positive 28 volt supply port connects through a 1N4005 diode (604) to a supply node (606). This supply node (606) connects through a 470 ohm resistor (607) and past a parallel grounded 1.5 KE39 Zenor diode (608) and a 4 microfarad capacitor (609) to the input port of an LM78LO5ACZ voltage regulator (611). The output of this voltage regulator (611) connects to a grounded 4 microfarad capacitor (612) and through a 10K ohm resistor (6713) to an ICL8069DC5Q Zenor diode (614). This Zenor diode (614) has connected in parallel with it a series joined 1K ohm resistor (616) and a 1K ohm variable resistor (617). The variable attenuation terminal of this variable resistor (617) connects to pin 36 of the display driver (618) which will be described in more detail below. The Zenor diode (614) also connects to pins 30, 31, 32 and 35 of the display driver (618), through a 0.01 microfarad capacitor (619) to pin 31 of the display driver (618) and also through a 1 mega ohm resistor (621) to the meter positive port, and to the meter common port.

The temperature in port connects through a 9,100 ohm resistor (622) to a variable 1K ohm resistor (612), the opposing side of which connects to the meter common port and the variable terminal of which connects to the temperature out port. The RPM in port connects through a 75K ohm resistor (624) to a 1K ohm variable resistor (626), the remaining terminal of which connects to the meter common port and to a grounded 3 microfarad capacitor (627). The variable terminal of this variable resistor (626) connects to the RPM out port. A 1N4005 diode (628) connects between terminals 9 and 12 as indicated.

The test port connects through a 10K ohm resistor (629) to the base of 2N2709A transistor (631) and through a parallel connected 10K ohm resistor (632) and a 0.01 microfarad capacitor (633) to the emitter of that same transistor (631). The collector of that transistor (631) connects to pin 37 of the display driver (618). The emitter of that transistor (631) connects to pin 8 of an ICL 7660CPA negative power supply to pin 1 of the display driver (618) and to the output of the voltage regulator (611). The negative power supply has a 4 microfarad capacitor (634) connected between pins 4 and 2 and another 4 microfarad capacitor (636) connected between pins 3 and 5, with pin 3 being additionally connected to ground and with pin 5 being connected to pin 26 of the display driver (618).

The amperage in and amperage out ports are connected in common, and the ground port connects to ground.

The display driver (618) may be provided by part No. ICL7107CPL as manufactured by Intersil. Pin 33 and 34 have a 0.0068 microfarad capacitor (637) connected therebetween. Pins 39, 38 and 40 are connected in parallel with a 0.068 microfarad capacitor (638) and a 100K ohm resistor (639). Similarly, pins 27, 28 and 29 are connected in parallel and with respect to a 0.0022 microfarad capacitor (641), a 120K ohm resistor (642) and a 0.0047 microfarad capacitor (643).

The output ports of the display driver are connected as indicated through four inverter buffer units (644, 646, 647 and 648) such as part No. 7407, to the seven segment displays (601 through 603) Pin 14 of each inverter/buffer (644, 646, 647 and 648) are connected by 2K ohm resistors (649, 651, 652 and 653) to the supply node (606) described above.

Figure 6:
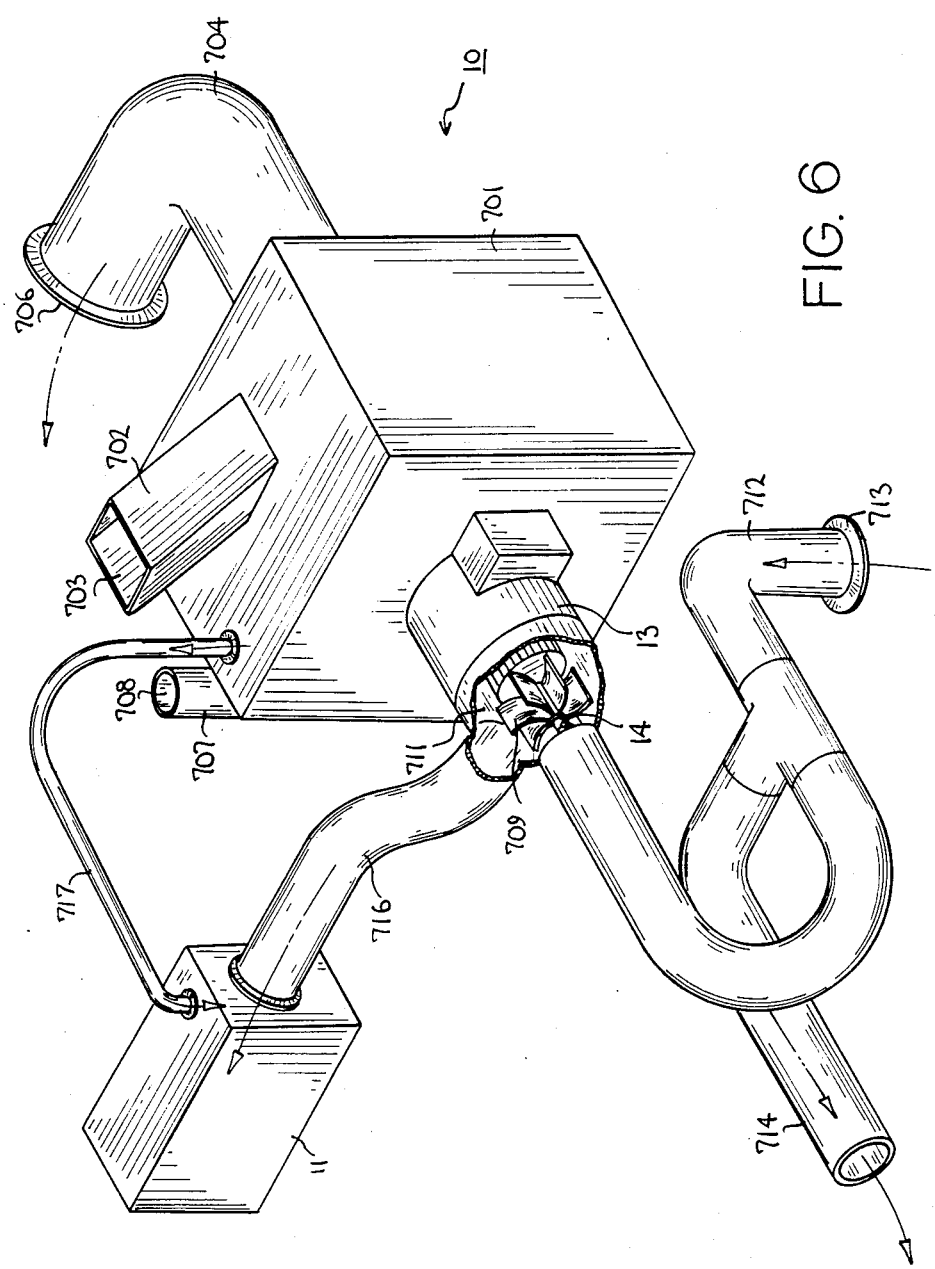
FIG. 6 provides an air flow diagram of the invention as connected to an on-board air conditioning system within an aircraft.

Referring now to FIG. 6, the pneumatic connections of the apparatus (10) to an aircraft mounted air conditioning system (11) will be described, along with a description of other air flow connections.

The turbine (12) and other mechanisms related to operation of the turbine (12) may be housed within an appropriate metal housing such as that depicted by the numeral (701). A metal conduit (702) may be provided with an entry port (703) exposed to the exterior of the aircraft (not shown). Combustion air for the turbine (12) may be provided through this conduit (702). An exhaust conduit (704) may be similarly connected to allow exhaust gases to be expelled from the aircraft through an exterior port (706). A radiator conduit (707) may also be provided to allow air from the exterior of the aircraft to enter through an entry port (708) and be provided to the oil cooler radiator of the turbine (12).

The generator (13) and the forced air unit (14) may be mounted on the exterior of the turbine enclosure (701). As shown in FIG. 6, the forced air unit (14) may be provided by use of an appropriate fan (709). The fan may be located within an appropriate chamber (711). A ram air inlet conduit (712) connects to the fan enclosure (711) and connects to an exterior port (713). During flight, air may be forced in through this opening (713) and through the ram inlet air conduit (712) as described in more detail below. An additional conduit or conduits (714) may be connected to the ram inlet as depicted for other uses as may be required.

A forced air exhaust conduit (716) also connects to the forced air unit enclosure (711). This conduit (716) connects to the air conditioning unit (11) which may make use of such forced iar.

Finally, the bleed air output of the turbine (12) may be connected through a conduit (717) to the air conditioning unit (11). This conduit (717) allows bleed air from the turbine (12) to be cooled by the air conditioning unit (11) and introduced into the cabin.

With continued reference to FIG. 6, it will be appreciated that when the turbine (12) operates, the generator (13) will turn and generate electricity and the forced air unit (14) will operate and create a flow of air. This flow of air serves both to cool the generator (13) and also to flow through the forced air unit exhaust conduit (716) to the air conditioning unit (11).

During this operation, combustion air may enter through the combustion conduit (702) and exhaust gases may be exited through the exhaust conduit (704). Proper cooling of the turbine (12) may further be faciliated by air entering through the air cooler radiator (707).

Bleed air from the turbine (12) will be introduced by the air conditioning unit (11) into one or more heat exchangers (not shown). Air from the forced air unit (14) will be allowed to flow about these heat exchangers in order to draw the heat away from the bleed air, such that the bleed air may be cooled.

When in flight, the turbine (12) may continue in operation, or may be deactivated. When deactivated, the generator (13) wil be quiescent and the forced air unit (14) will be stilled as well. Through movement of the aircraft through the atmosphere, however, air will be forced in through the ram inlet (713) and will flow through the ram air conduit (712) until it reaches the forced air unit enclosure (711). The ram air forced air will then travel through this enclosure (711) and through the forced air unit exhaust conduit (716) and into the air conditioning unit (11). The air conditioning unit (11) will again operate to use this forced air to facilitate proper cooling of the aircraft.

The construction and installation of the apparatus as described above results in a very lightweight auxiliary power and forced air supply unit that operates very efficiently and without sacrifice of quality performance. This result arises through many improvements obtained by the applicant. For instance, the generator-connected fan (709) that comprises the forced air unit (14) save much weight by obviating the need for an electrically powered blower as used in other auxiliary pwoer units. The unipurpose generator (13) allows a lighter generator to be used and operates well since the generator (13) need not be able to accommmodate a variable operating range. The electrical configuration maximizes the use of lightweight parts and minimizes the required number of parts without sacrifice of operating characteristics or critical safety considerations.

The success of this design is well exemplified by recent installations of the apparatus in aircraft. The apparatus has performed safely and efficiently, exhibiting the capability of lowering air conditioning air temperatures to 35° F., and with a total installed weight of 170 pounds. Other aircraft might require additional ductwork in order to install the apparatus, and hence this figure could be somewhat higher in other applications. Nevertheless, as installed, this apparatus will not exceed 200 pounds, and will usually weigh much less than this.

Obviously, numerous modifications and variations of the present invention are possible in light of the above teachings. It is therefore to be understood that within the scope of the appended claims, the invention may be practised otherwise than as specifically described herein.

We claim:

1. An auxiliary power and forced air supply unit for use on a vehicle having an on-board air conditioning unit, the auxiliary power and forced air supply unit comprising:
   (a) a turbine unit for creating rotational energy;
   (b) a generator unit operably connected to said turbine unit for converting at least a portion of said rotational energy into electrical enregy for use by said vehicle and said air conditioning unit; and (c) a forced air unit operably connected to said turbine unit for converting at least a portion of said rotational energy into a flow of air, which flow of air can be utilized by said air conditioning unit to aid in cooling air that will be input into a cabin of said vehicle; wherein said forced air unit comprises a fan affixed to said generator unit, such that rotational energy from said turbine unit will be directly transferred through said generator unit to said fan; and wherein said auxiliary power and forced air supply unit weighs less than two hundred pounds when operably installed in said vehicle.

2. The auxiliary power and forced air supply unit of claim 1 wherein said generator unit comprises a generator that will provide approximately three hundred amperes at approximately 30 volts only over a substantially narrow operating range of about twelve thousand revolutions per minute.

3. The auxiliary power and forced air supply unit of claim 1 wherein said generator unit has no starter windings.

4. The auxiliary power and forced air supply unit of claim 3 wherein said generator unit is started by controlling field windings contained within said generator unit.

5. The auxiliary power and forced air supply unit of claim 1 wherein said forced air unit pneumatically connects to a ram air inlet, such that while said vehicle is in motion, atmospheric contents will enter said ram air inlet, pass through said forced air unit, and be utilized by said air conditioning unit to aid in cooling air that will be input into a cabin of said vehicle.

6. An auxiliary power and forced air supply unit for use on a vehicle having an on-board air conditioning unit, the auxiliary power and forced air supply unit comprising:

(a) a turbine unit for creating rotational energy;

(b) a generator unit operably connected to said turbine unit for converting at least a portion of said rotational energy into electrical energy for use by said vehicle and said air conditioning unit; and (c) a forced air unit operably connected to said turbine unit for converting at least a portion of said rotational energy into a flow of air, which flow of air can be utilized by said air conditioning unit to aid in cooling air that will be input into a cabin of said vehicle; wherein said auxiliary power and forced air supply unit weighs less than two hundred pounds when operably installed in said vehicle and wherein a conduit connects between a bleed air output port of said turbine unit and said air conditioning unit, such that bleed air from said turbine unit can be directed to said air conditioning unit where said flow of air from said forced air unit may be utiilized to cool said bleed air.

7. The auxiliary power and forced air supply unit of claim 1 and further including:

(a) an electronic sequence unit operably connected to said turbine unit for activating, operating and deactivating said turbine unit; and (b) a primary control unit operably connected to said electronic sequence unit for controlling said electronic sequence unit.

8. The auxiliary power and forced air supply unit of claim 7 and further including a heat sensor unit operably connected to said turbine unit and to said primary control unit such that said heat sensor unit can sense unsafe heat conditions with respect to said turbine unit and said primary control unit can control said turbine unit through said electronic sequence unit in response to such sensing of unsafe heat conditions.

9. The auxiliary power and forced air supply unit of claim 7 and further including an input control unit located proximal to a pilot's operating station within said vehicle, said input control unit being operably connected to said primary control unit such that said primary control unit can be controlled by a pilot of said vehicle when said pilot is located within said pilot's operating station.

10. An auxiliary power and forced air supply unit for use in an aircraft having:
an interior cabin;
a pilot's operating station;
a fuel tank;
a bleed air inlet; and
an air conditioning system; the auxiliary power and forced air supply unit comprising:

(a) fuel valve means connected to said fuel tank for selectively allowing fuel to flow from said fuel tank through said fuel valve means;

(b) fuel pump means operably connected to said fuel valve means for selectively causing fuel to be pumped from said fuel tank through said fuel valve means and said fuel pump means;

(c) turbine means operably connected to said fuel pump means for receiving said fuel and for consuming said fuel in response to an ignition signal to thereby generate rotational energy;

(d) generator means operably connected to said turbine means for converting at least part of said rotational energy into electricity for use by electrical systems contained in said aircraft, said generator means having field windings and no starter windings;

(e) forced air means operably connected to said turbine means for converting at least part of said rotational energy into a flow of air for use by the air conditioning system of said aircraft and for simultaneous use in cooling said generator means wherein said forced air means includes a fan affixed to said generator means, such that at least some rotational energy from said turbine means will be directly transferred through said generator means to said fan;

(f) electronic sequence means for controlling operation of:
(i) said fuel valve means; and
(ii) start-up and de-activation of said turbine means; and for monitoring revolutions per minute and exhaust gas temperature for said turbine means, said electronic sequence means further including first display means for displaying at least some predetermined discreet fault modes;

(g) input control means mounted in the pilot's operating station of said aircraft for allowing control instructions to be entered to thereby allow start-up and de-activation of said turbine means and said generator means, wherein said input control means further includes second display means for selectively displaying a percent rpm and exhaust temperature for said turbine means;

(h) primary control means responsive to said input control means for monitoring and controlling operation of said forced air means, said generator means, including control of said field windings for purposes of activating said generator means, and said electronic sequence means with respect to control of said turbine means; and (i) ignition exciter means operably connected to said turbine means and responsive to said electronic sequence means for selectively energizing and activating said turbine means.

11. The auxiliary power and forced air supply unit of claim 10 wherein said forced air means includes a cavity formed therein for receiving said fan.

12. The auxiliary power and forced air supply unit of claim 10 and further including heat sensor means for sensing when said turbine means constitutes a fire hazard and for providing a signal in response thereto.

13. The auxiliary power and forced air supply unit of claim 12 wherein said primary control means is responsive to said signal from said heat sensor means by providing a control signal.

14. The auxiliary power and forced air supply unit of claim 13 and further including fire protection means responsive to said control signal for at least retarding a fire as regards said turbine means.

15. The auxiliary power and forced air supply unit of claim 14 wherein said fire protection means includes fire retardant chemicals that said fire protection means sprays onto said turbine means.

16. The auxiliary power and forced air supply unit of claim 15 wherein said input control means includes means for selectively allowing manual operation of said fire protection means.

17. The auxiliary power and forced air supply unit of claim 12 wherein said heat sensor means includes a plurality of thermocouple mechanisms disposed about said turbine means.

18. The auxiliary power and forced air supply unit of claim 10 wherein said primary control means activates said generator means by controlling said field windings to thereby control a shunt field caused thereby.

19. The auxiliary power and forced air supply unit of claim 10 and further including bleed air valve means operably connected to said air conditioning system and said electronic sequence means for selectively allowing bleed air to flow from said bleed air inlet to said air conditioning system as controlled and allowed by said electronic sequence means.

20. The auxiliary power and forced air supply unit of claim 19 wherein said bleed air valve means provides bleed air to said air conditioning system through said forced air means.

21. The auxiliary power and forced air supply unit of claim 10 wherein said electronic sequence unit provides percentage rpm and exhaust temperature information to said second display means of said input control means for allowing display of said information by said second display means.

* * * * *